(12) United States Patent
Li et al.

(10) Patent No.: US 11,792,272 B2
(45) Date of Patent: Oct. 17, 2023

(54) ESTABLISHMENT OF SOCKET CONNECTION IN USER SPACE

(71) Applicant: Microsoft Technology Licensing, LLC, Redmond, WA (US)

(72) Inventors: Bojie Li, Haidian (CN); Tianyi Cui, Redmond, WA (US); Zibo Wang, Redmond, WA (US); Wei Bai, Redmond, WA (US); Lintao Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/287,986

(22) PCT Filed: Nov. 1, 2019

(86) PCT No.: PCT/US2019/059293
§ 371 (c)(1),
(2) Date: Apr. 22, 2021

(87) PCT Pub. No.: WO2020/096869
PCT Pub. Date: May 14, 2020

(65) Prior Publication Data
US 2021/0377345 A1    Dec. 2, 2021

(30) Foreign Application Priority Data
Nov. 9, 2018  (CN) .......................... 201811332435.0

(51) Int. Cl.
*H04L 29/08* (2006.01)
*G06F 9/54* (2006.01)
(Continued)

(52) U.S. Cl.
CPC ............ *H04L 67/141* (2013.01); *G06F 9/544* (2013.01); *G06F 13/1663* (2013.01);
(Continued)

(58) Field of Classification Search
None
See application file for complete search history.

(56) References Cited

U.S. PATENT DOCUMENTS

| 6,212,572 B1 * | 4/2001 | Aydin | G06F 9/544 719/312 |
| 7,864,787 B2 * | 1/2011 | Oved | H04L 12/18 370/389 |

(Continued)

FOREIGN PATENT DOCUMENTS

| CN | 102339234 A | 2/2012 |
| CN | 103946827 A | 7/2014 |

(Continued)

OTHER PUBLICATIONS

"First Office Action and Search report Issued in Chinese Patent Application No. 201811332435.0", dated Jan. 12, 2022, 16 Pages.
(Continued)

*Primary Examiner* — Umut Onat
(74) *Attorney, Agent, or Firm* — Schwegman Lundberg & Woessner, P.A.

(57) ABSTRACT

A technique provides a solution for establishing a socket connection in a user space. After receiving a request for establishing a socket connection from a first application, the monitor sends the connection request to a second application, wherein the first application and the second application run on the same computing device. Then, the monitor coordinates establishing, in user space of the operating system, a peer-to-peer socket connection between the first application and the second application. By establishing a socket connection in the user space of the operating system, embodiments of the present disclosure can achieve a user space socket connection between different applications within a single computing device, thereby improving the performance of the operating system. In addition, embodi-
(Continued)

ments of the present disclosure use the monitor (or controller) to coordinate inter-application connection establishment and resource allocation, thereby ensuring security of the operating system.

13 Claims, 16 Drawing Sheets

(51) Int. Cl.

| | |
|---|---|
| H04L 29/06 | (2006.01) |
| H04L 67/141 | (2022.01) |
| H04L 67/104 | (2022.01) |
| H04L 69/163 | (2022.01) |
| G06F 13/16 | (2006.01) |
| G06F 15/173 | (2006.01) |

(52) U.S. Cl.
CPC .. *G06F 15/17331* (2013.01); *G06F 15/17337* (2013.01); *H04L 67/104* (2013.01); *H04L 69/163* (2013.01)

(56) References Cited

U.S. PATENT DOCUMENTS

| | | | |
|---|---|---|---|
| 8,544,025 B2* | 9/2013 | Bhandiwad | G06F 9/545 |
| | | | 719/314 |
| 9,954,979 B2* | 4/2018 | Herr | H04L 69/16 |
| 10,681,008 B1* | 6/2020 | Emelyanov | H04L 43/0811 |
| 2008/0198781 A1 | 8/2008 | Rajakarunanayake et al. | |
| 2010/0023626 A1* | 1/2010 | Hussain | H04L 69/16 |
| | | | 709/227 |
| 2012/0030687 A1* | 2/2012 | Bhandiwad | G06F 9/545 |
| | | | 709/227 |
| 2015/0127849 A1* | 5/2015 | Luo | H04L 69/163 |
| | | | 709/235 |
| 2017/0012844 A1 | 1/2017 | Ellison et al. | |
| 2017/0085683 A1* | 3/2017 | Herr | H04L 43/16 |

FOREIGN PATENT DOCUMENTS

| | | |
|---|---|---|
| FR | 2699305 A1 | 6/1994 |
| WO | 2012044828 A2 | 4/2012 |
| WO | 2016193852 A1 | 12/2016 |
| WO | 2017046582 A1 | 3/2017 |

OTHER PUBLICATIONS

"DPDK: Data Plane Development Kit", Retrieved from: https://web.archive.org/web/20141228013706/https://www.dpdk.org/, Dec. 28, 2014, 1 Page.
"High-Performance Network Framework Based on DPDK", Retrieved From: http://www.f-stack.org/#:~:text=F%2DStack%20is%20an%20open,(Nginx%2C%20Redis)%20interface., Retrieved Date: May 19, 2021, 5 Pages.
"Intel® 64 and IA-32 Architectures Software Developer Manual vol. 3", Retrieved from: https://software.intel.com/en-us/articles/intel-sdm, Sep. 2016, 1998 Pages.
"Mellanox Adapters Programmer's Reference Manual", Retrieved From: https://www.mellanox.com/related-docs/user_manuals/Ethernet_Adapters_Programming_Manual.pdf, Retrieved Date: May 19, 2021, 316 Pages.
"Mellanox Messaging Accelerator (VMA)", Retrieved From: https://github.com/mellanox/libvma, Retrieved Date: May 21, 2021, 2 Pages.
"Myricom DBL", Retrieved From: https://www.ariacybersecurity.com/network-adapters/software/dbl/, Retrieved From: May 19, 2021, 8 Pages.
"PF Ring", Retrieved From: https://www.ntop.org/products/packet-capture/pf_ring/, Retrieved Date: May 19, 2021, 5 Pages.
"Physical Address Memory Region", Retrieved From: https://community.mellanox.com/s/article/physical-address-memory-region#:~:text=The%20Physical%20Address%20Memory%20Region,memory%20regions%20with%20random%20access., Feb. 20, 2019, 4 Pages.
"Seastar: High-Performance Server-Side Application Frame-Work", Retrieved From: http://seastar.io/, Retrieved Date May 19, 2021, 4 Pages.
"The Infiniband Architecture Specification", Retrieved From: https://www.infinibandta.org/ibta-releases-new-infiniband-architecture-specification/#:~:text=The%20InfiniBand%20Architecture%20Specification%20Volume,computing%20clusters%20and%20embedded%20environments., Nov. 14, 2012, 3 Pages.
Mitchell, et al. "Using One-Sided RDMA Reads to Build a Fast, CPU-Efficient Key-Value Store", in Proceedings of the USENIX Annual Technical Conference, Jun. 26, 2013, pp. 103-114.
Baumann, et al., "The Muitikernel: A New OS Architecture for Scalable Multicore Systems", in Proceedings of the 22nd ACM Symposium on Operating Systems Principles, Oct. 11, 2009, pp. 29-44.
Belay, et al., "The IX Operating System: Combining Low Latency, High Throughput, and Efficiency in a Protected Dataplane", in Journal ACM Transactions on Computer Systems (TOCS), vol. 34, Issue 4, Article 11, Jan. 2017, 39 Pages.
Boyd-Wickizer, et al., "An analysis of Linux scalability to Many Cores", in Proceedings of the 9th USENIX conference on Operating systems design and implementation, OSDI, Oct. 4, 2010, pp. 1-16.
Chu, et al., "Zero-Copy TCP in Solaris", in Proceedings of the 1996 Annual Conference on USENIX Annual Technical Conference, Jan. 22, 1996, 13 Pages.
Clements, et al., "The Scalable Commutativity Rule: Designing Scalable Software for Multicore Processors", in Journal of ACM Transactions on Computer Systems, vol. 34, Issue 4, Article No. 10, Jan. 2015, 47 Pages.
Corbet, Jonathan, "Kaiser: Hiding the Kernel From User Space", Retrieved From: https://lwn.net/Articles/738975/, Nov. 15, 2017, 10 Pages.
Crawford, et al., "High performance user space sockets on low power System on a Chip platforms", in Proceedings of IEEE High Performance Extreme Computing Conference, Sep. 15, 2015, 6 Pages.
Dalton, et al., "Andromeda: Performance, Isolation, and Velocity at Scale in Cloud Network Virtualization", in Proceedings of the 15th USENIX Symposium on Networked Systems Design and Implementation., Apr. 9, 2018, pp. 373-387.
Dragojevic, et al., "FaRM: Fast Remote Memory", in Proceedings of 11th USENIX Symposium on Networked Systems Design and Implementation, Apr. 2, 2014, pp. 401-414.
Dunkels, Adam, "Design and Implementation of the LwIP TCP/IP Stack", in Journal of Swedish Institute of Computer Science, vol. 02, Issue 77, Feb. 20, 2001, 46 Pages.
Firestone, et al., "Azure Accelerated Networking: SmartNICs in the Public Cloud", in Proceedings of the 15th USENIX Symposium on Networked Systems Design and Implementation, Apr. 9, 2018, pp. 51-64.
Fox, et al., "Shared Memory Communications over RDMA; draft-fox-tcpm-shared-memory-rdma-00.txt", Retrieved From: https://tools.ietf.org/pdf/draft-fox-tcpm-shared-memory-rdma-00.pdf, Jul. 9, 2012, 133 Pages.
Guo, et al., "RDMA over Commodity Ethernet at Scale", in Proceedings of the ACM SIGCOMM Conference, Aug. 22, 2016, pp. 202-215.
Han, et al., "MegaPipe: A New Programming Interface for Scalable Network I/O", in Proceedings of 10th USENIX Symposium on Operating Systems Design and Implementation, OSDI 2012, Oct. 8, 2012, pp. 135-148.
Hefty, Sean, "Rsockets", in Proceedings of 2012 Open Fabris International Workshop, Mar. 2012, 40 Pages.
Hoare., C. A. R., "Monitors: An Operating System Structuring Concept", in Publication of the origin of Concurrent Programming, Jan. 1974, pp. 549-557.

(56) References Cited

OTHER PUBLICATIONS

Huang, et al., "LOS: A High Performance and Compatible User-level Network Operating System", in Proceedings of the First Asia-Pacific Workshop on Networking, Aug. 2017, pp. 50-56.

Jeong, et al., "mTCP: A. Highly Scalable User-level TCP Stack for Multicore Systems", in Proceedings of the 11th USENIX Symposium on Networked Systems Design and Implementation, Apr. 2, 2014, pp. 489-502.

Kalia, et al., "Design Guidelines for High Performance RDMA Systems", in Proceedings of 2016 USENIX Annual Technical Conference, Jun. 22, 2016, pp. 437-450.

Kalia, et al., "Using RDMA Efficiently for Key-value Services", in Proceedings of the ACM Conference on SIGCOMM, Aug. 17, 2014, pp. 295-306.

Kaufmann, et al., "FlexNIC: Rethinking Network DMA", in Proceedings of 15th Workshop on Hot Topics in Operating Systems, May 18, 2015, 7 Pages.

Kocher, et al., "Spectre Attacks: Exploiting Speculative Execution", in Repository of arXiv:1801.01203v1, Jan. 3, 2018, 16 Pages.

Li, et al., "ClickNP: Highly Flexible and High Performance Network Processing with Reconfigurable Hardware", in Proceedings of the ACM SIGCOMM Conference, Aug. 22, 2016, pp. 1-14.

Lin, et al., "Scalable Kernel TCP Design and Implementation for Short-Lived Connections", in Journal of ACM SIGARCH Computer Architecture News, vol. 44, Issue 2, Mar. 2016, pp. 339-352.

Lipp, et al., "Meltdown", in Repository of arXiv:1801.01207, Jan. 3, 2018, 16 Pages.

Lu, et al., "Memory Efficient Loss Recovery for Hardware-based Transport in Datacenter", in Proceedings of the First Asia-Pacific Workshop on Networking, Aug. 3, 2017, pp. 22-28.

Lu, et al., "Multi-Path Transport for RDMA in Datacenters", in Proceedings of 15th USENIX Symposium on Networked Systems Design and Implementation, Apr. 9, 2018, pp. 357-371.

Madhavapeddy, et al., "Unikernels: Library Operating Systems for the Cloud", in Journal of ACM SIGARCH Computer Architecture News, vol. 41, Issue 1, Mar. 2013, pp. 461-472.

Marinos, et al., "Network Stack Specialization for Performance", in Proceedings of the 2014 ACM conference on SIGCOMM, Aug. 17, 2014, pp. 175-186.

Martins, "ClickOS and the Art of Network Function Virtualization", in Proceedings of the 11th USENIX Symposium on Networked Systems Design and Implementation, NSDI 2014, Apr. 2, 2014, pp. 459-473.

Nishtala, et al., "Scaling Memcache at Facebook", in Proceedings of the 10th USENIX Symposium on Networked Systems Design and Implementation, NSDI 2013, Apr. 2, 2013, pp. 385-398.

Niu, et al., "Network Stack as a Service in the Cloud", in Proceedings of the 16th ACM Workshop on Hot Topics in Networks, Nov. 30, 2017, pp. 65-71.

Panda, et al., "NetBricks: Taking the V out of NFV", in Proceedings of the 12th USENIX conference on Operating Systems Design and Implementation, Nov. 2, 2016, pp. 203-216.

"International Search Report and Written Opinion issued in PCT Application No. PCT/US19/059293", dated Feb. 3, 2020, 12 Pages.

Pesterev, et al., "Improving Network Connection Locality on Multicore Systems", in Proceedings of the 7th ACM European conference on Computer Systems, Apr. 10, 2012, pp. 337-350.

Peter, et al., "Arrakis: The Operating System Is the Control Plane", in Journal of ACM Transactions on Computer Systems, vol. 33, Issue 4, Jan. 2016, 30 Pages.

Pinkerton, Jim, "Sockets Direct Protocol v1.0 RDMA Consortium", Retrieved From: http://rdmaconsortium.org/home/SDP_tutoriai_v1.0d.pdf, Oct. 24, 2003, 32 Pages.

Pope, et al., "Introduction to OpenOnload—building application transparency and protocol conformance into application acceleration middleware", Retrieved From: http://www.moderntech.com.hk/sites/default/flles/whitepaper/SF-105918-CD-1_Introduction_to_OpenOnload_White_Paper.pdf, 2011, 8 Pages.

Rizzo, "Netmap: A Novel Framework for Fast Packet I/O", in Proceedings of the USENIX conference on Annua Technical Conference, Jun. 13, 2012, 12 Pages.

Zhu, et al., "Congestion control for large-scale RDMA deployments", in Proceedings of the 2015 ACM Conference on Special Interest Group on Data Communication, Aug. 17, 2015, pp. 523-536.

Roghanchi, et al., "ffwd: delegation is (much) faster than you think", in Proceedings of the 26th Symposium on Operating Systems Principles; Oct. 28, 2017, pp. 342-356.

Sewell, et al., "x86-TSO: A Rigorous and Usable Programmer's Model for x86 Multiprocessors", in Journal of Communications of the ACM, vol. 53, No. 7, Jul. 2010, pp. 89-97.

Soares, et al., "FlexSC: Flexible System Call Scheduling with Exception-Less System Calls", in Proceedings of the 9th USENIX Conference on Operating Systems Design and Implementation, Oct. 4, 2010, 14 Pages.

Thadani, et al., "An Efficient Zero-Copy I/O Framework for UNIX®", in Publication of Sun Microsystems Laboratories, May 1995, 19 Pages.

Tsai, et al., "LITE Kernel RDMA Support for Datacenter Applications", in Proceedings of the 26th Symposium on Operating Systems Principles, Oct. 28, 2017, pp. 306-324.

Woo, et al., "Elastic Scaling of Stateful Network Functions"; in Proceedings of 15th USENIX Symposium on Networked Systems Design and Implementation, Apr. 9, 2018, pp. 299-312.

Yasukata, et al., "StackMap: Low-Latency Networking with the OS Stack and Dedicated NICs", in Proceedings of 2016 USENIX Annual Technical Conference, Jun. 22, 2016, pp. 43-56.

Yu, et al., "FreeFlow: High Performance Container Networking", in Proceedings of the 15th ACM Workshop on Hot Topics in Networks, HotNets 2016, Nov. 9, 2016, pp. 43-49.

"Third Office Action Issued in Chinese Patent Application No. 201811332435.0", dated Aug. 10, 2022, 7 Pages.

"Second Office Action and Search Report Issued in Chinese Patent Application No. 201811332435.0", (w/ English Translation), dated May 31, 2022, 14 Pages.

Luing, Wang, "Key Technologies of Programming Model and Consensus Protocol in Named Data Networking", (w/ English Abstract), in Dissertation Submitted to Tsinghua University, Jun. 2017, 143 Pages.

Mahabaleshwarkar, et al., "TCP/IP Protocol Acceleration", in International Conference on Computer Communication and Informatics (ICCCI), Jan. 10, 2012, 4 Pages.

"Notice of Allowance Issued in Chinese Patent Application No. 201811332435.0", dated Jan. 5, 2023, 4 Pages.

* cited by examiner

ESTABLISHMENT OF SOCKET CONNECTION IN USER SPACE

CROSS-REFERENCE TO RELATED APPLICATION

This application is a U.S. National Stage Filing under 35 U.S.C. 371 of International Patent Application Serial No. PCT/US2019/059293, filed Nov. 1, 2019, and published as WO 2020/096869 A1 on May 14, 2020, which claims priority to Chinese Application No. 201811332435.0, filed Nov. 9, 2018, which applications and publication are incorporated herein by reference in their entirety.

BACKGROUND

A socket refers to an endpoint in a bidirectional communication connection between two applications running in a network, which is a fundamental operating unit of network communication complying with a Transmission Control Protocol/Internet Protocol (TCP/IP). The socket constitutes an abstract layer, through which an application sends and receives data. The socket is typically represented by an IP address and a port number. A sending application sends data to the socket, then forwards the data to another socket via a network drive, and further transmits the data to a receiving application. Socket is the most widely used communication primitive, which can implement communications among processes, threads and hosts.

The core of an operating system is a kernel which is independent of a common application program, and it can access a protected memory space and is allowed to access the underlying hardware devices. In order to ensure security of the kernel, the operating system typically restricts a user process from directly operating the kernel. The specific implementation is basically carried out in such a manner that the operating system divides the virtual address space into two parts, where one part is the kernel space while the other part is the user space. The kernel space is used by the kernel only, while the user space is available for various processes.

The operating system commonly implements socket connections in the kernel space, and sets a shared data structure which requires concurrency protection. Generally, the socket has the following three functions: addressing, positioning and connecting to a further application; providing a reliable and orderly communication channel identified by a file descriptor (FD); and multiplexing events from a plurality of channels, such that the operating system can notify an application of which FDs are ready for receiving or sending, and then the application may have a buffer prepared and issue a receiving or sending operation.

SUMMARY

In embodiments of the present disclosure, there is provided a solution for establishing a socket connection in a user space. After receiving a request for establishing a socket connection from a first application, the monitor sends the connection request to a second application, wherein the first application and the second application run on the same computing device. Then, the monitor coordinates establishing, in user space of the operating system, a peer-to-peer socket connection between the first application and the second application. By establishing a socket connection in the user space of the operating system, embodiments of the present disclosure can achieve a user space socket connection between different applications within a single computing device, thereby improving the performance of the operating system. In addition, embodiments of the present disclosure use the monitor (or controller) to coordinate inter-application connection establishment and resource allocation, thereby ensuring security of the operating system.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following Detailed Description with reference to the accompanying drawings, the above and other objectives, features and advantages of example embodiments of the present disclosure will become more apparent, in which the same reference numbers generally refer to the same elements.

DETAILED DESCRIPTION OF EMBODIMENTS

Figure 1:
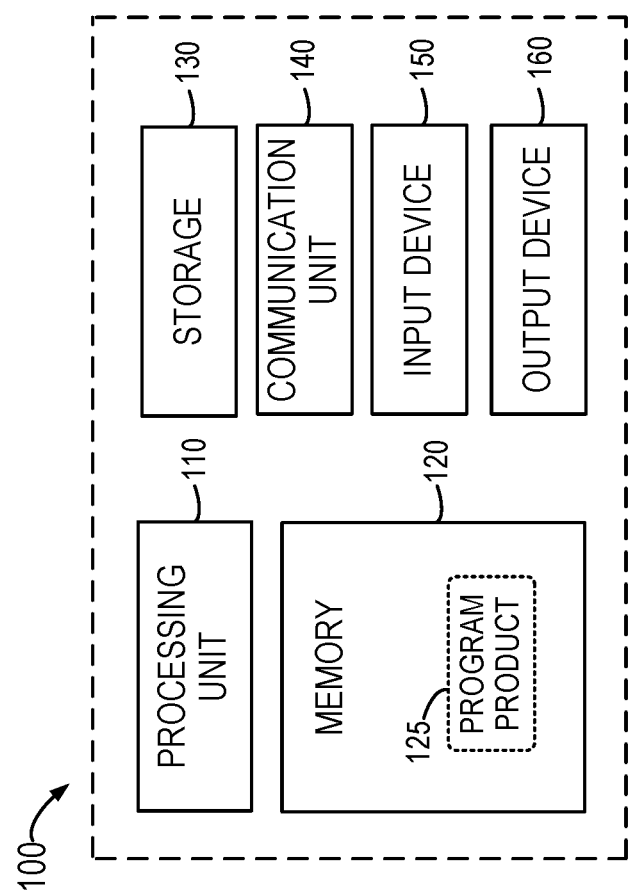
FIG. 1 is a block diagram illustrating a computing device/server in which one or more embodiments of the present disclosure may be implemented.

Embodiments of the present disclosure will now be described in detail with reference to the drawings. Although some embodiments disclosed herein are illustrated in the drawings, it would be appreciated that the present disclosure can be implemented in various manners and should not be limited to the embodiments described herein. Rather, those embodiments are provided merely to describe the present disclosure thoroughly and completely. It would be appreciated that the drawings and embodiments of the present disclosure are provided only as examples and are not intended for limiting the scope disclosed herein in any manner.

As used herein, the term "comprises" and its variants are to be read as open-ended terms that mean "comprises, but is not limited to." The term "based on" is to be read as "based at least in part on." The term "an embodiment" is to be read as "at least one example embodiment;" the term "another embodiment" is to be read as "at least one further embodiment;" and the term "some embodiments" is to be read as "at least some embodiments." Relevant definitions of other terms will be given in the following description.

Traditionally, an operating system implements sockets in a kernel space. Due to the complicated network stack structure, sockets in the kernel space are quite slow, incurring significant overheads. For example, communication-intensive applications (for example, distributed key-value storage and network servers) spend most of CPU time in the kernel space of the operating system, mostly processing socket operations. It is seen that the traditional socket connections in the kernel space may incur large time overheads and degrade the performance of the operating system. Moreover, some improvements to the traditional operating system still contain some problems in terms of security and compatibility, and the improvements cannot achieve a user space socket connection between applications in a single computing device.

To this end, embodiments of the present disclosure provide a method, a device and a computer program product for establishing a peer-to-peer socket connection in a user space. By establishing a socket connection in a user space, embodiments of the present application can implement a user space socket connection between different applications in a single computing device, to avoid kernel crossing overheads, thereby improving the performance of the operating system. In addition, since a monitor (or a controller) having a control coordinating function is utilized to coordinate inter-application connection establishment and resource allocation, embodiments of the present application can ensure security of the operating system.

Furthermore, embodiments of the present disclosure use a monitor to coordinate inter-application connection establishment and resource allocation, and meanwhile, the inter-application peer-to-peer socket connection is directly used for data communication, without involvement of the monitor. In this way, it can ensure security of the operating system, but can also promote the performance of the operating system. Besides, embodiments of the present disclosure can detect whether a remote device supports a user space socket, and adopt the traditional TCP connection if the remote device does not support the user space socket, thereby ensuring compatibility of network communications.

Basic principles and several example implementations of the present disclosure will now be described with reference to FIGS. 1-12. FIG. 1 illustrates a block diagram of a computing device/server 100 that may implement one or more embodiments of the present disclosure. It would be appreciated that the computing device/server 100 as shown in FIG. 1 is merely provided as an example, rather than constituting any limitation to the functionalities and scope of implementations as described in the present disclosure.

As shown in FIG. 1, the computing device/server 100 is in the form of general computing device. Components of the computing device/server 100 can include, but are not limited to, one or more processors or processing units 110, a memory 120, a storage device 130, one or more communication units 140, one or more input devices 150, and one or more output devices 160. The processing unit 110 may be any physical or virtual processor and can perform various processing based on programs stored in the memory 120. In a multi-processor system, multiple processing units execute computer-executable instructions in parallel to improve the parallel processing capacity of the computing device/server 100.

The computing device/server 100 typically includes a plurality of computer storage media, which may be any available media accessible by the computing device/server 100, including, but not limited to, volatile and non-volatile media, and removable and non-removable media. The memory 120 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any removable or non-removable medium, and may include a machine-readable medium, such as a flash drive, disk or any other medium, which can be used for storing information and/or data and accessed in the computing device/server 100.

The computing device/server 100 may further include additional removable/non-removable, volatile/non-volatile memory media. Although not shown in FIG. 1, a disk drive may be used for reading and writing a removable and non-volatile disk (for example, a floppy disk) and a disc drive may be used for reading and writing a removable non-volatile disc. In these cases, each drive may be connected to the bus (not shown) via one or more data medium interfaces. The memory 120 may include a computer program product 125 having one or more program modules which are configured to perform the method or acts of various embodiments of the present disclosure.

The communication unit 140 communicates with a further computing device via communication media. In addition, functionalities of components in the computing device/server 100 may be implemented by a single computing cluster or multiple computing machines connected communicatively for communication. Therefore, the computing device/server 100 may be operated in a networking environment using a logical link with one or more other servers, network personal computers (PCs) or another general network node.

The input device 150 may include one or more input devices, such as a mouse, keyboard, tracking ball, and the like. The output device 160 may include one or more output devices, such as a display, loudspeaker, printer and the like.

As required, the computing device/server 100 may also communicate via the communication unit 140 with one or more external devices (not shown) such as a storage device, display device and the like, one or more devices that enable users to interact with the computing device/server 100, or any devices that enable the computing device/server 100 to communicate with one or more other computing devices (for example, a network card, modem, and the like). Such communication may be performed via an input/output (I/O) interface (not shown).

Embodiments of the present disclosure can implement peer-to-peer socket communication in a user space of an operating system of a computing device/server 100, and example embodiments about how the peer-to-peer socket communication is implemented in the user space of the operating system will be detailed below with reference to FIGS. 2-12.

Figure 2:
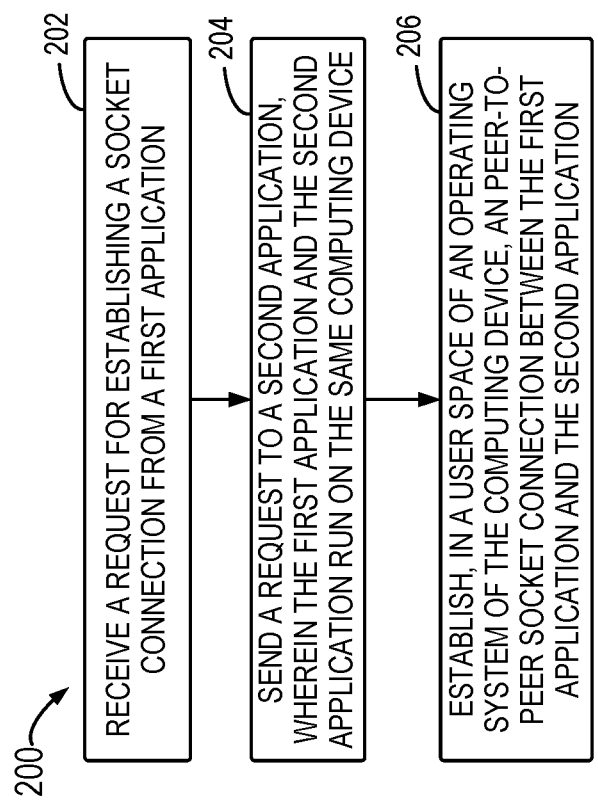
FIG. 2 is a flowchart illustrating a method of establishing an peer-to-peer socket connection in a user space according to embodiments of the present disclosure.

FIG. 2 is a flowchart illustrating a method 200 of establishing a peer-to-peer connection in a user space according to embodiments of the present disclosure. It should be appreciated that, the method 200 may be executed by the computing device/server 100 as described with reference to FIG. 1. For clarification of the method 200 of FIG. 2, description will be given in combination with the example of architecture 300 as shown in FIG. 3, which is a schematic diagram of architecture 300 for implementing a socket connection in a single computing device according to embodiments of the present disclosure.

At 202, a request for establishing a socket connection is received from a first application. For example, in the example architecture 300 as described with reference to FIG. 3, a computing device 310 (which is also referred to as "host") runs thereon an application 311 (which is referred to as "a first application"), an application 312 (which is referred to as "a second application"), and a monitor 313 (which is also referred to as "a controller," "a control module," or the like) for coordinating inter-application connection establishment and resource allocation, where the computing device 310 may be the computing device/server 100 as described above with reference to FIG. 1. The monitor 313 is a background program for coordinating control layer operations (for example, connection establishment and resource allocation), which is started at the initial phase of the operating system. In each computing device, each application establishes a queue with the local monitor so as to form a control layer. In some embodiments, in order to achieve low latency and high throughput, the queue, for example, may be a shared memory (which is simply referred to as "shm") queue.

Figure 3:
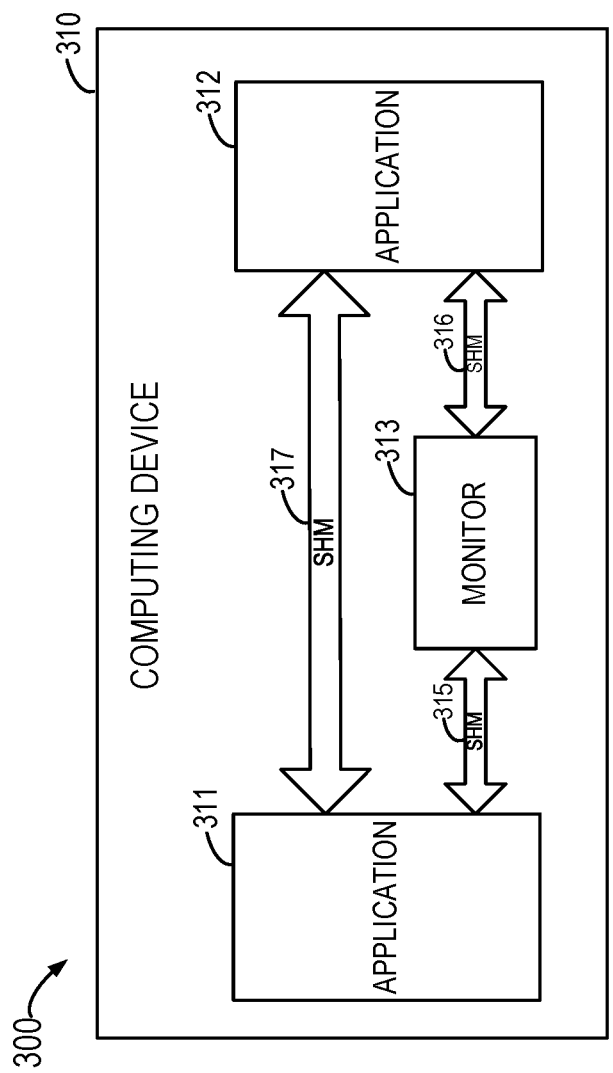
FIG. 3 is a schematic diagram illustrating architecture for implementing a socket connection in a single computing device according to embodiments of the present disclosure.

As shown in FIG. 3, a shared memory queue 315 may be established between the application 311 and the monitor 313, and a shared memory queue 316 may be established between the application 312 and the monitor 313. When the application 311 needs to establish a socket connection, the monitor 313 may receive a request for establishing a socket connection from the application 311 via the shared memory queue 315. In some embodiments of the present disclosure, each computing device is typically arranged with a monitor, each application may be loaded with a user space library LIBSD by setting an LD_PRELOAD environment variable, and the LIBSD intercepts all APIs related to file descriptor operations such that socket APIs can be implemented in the user space while other APIs are forwarded to the kernel space. At the initial phase, each application is connected to the local monitor. It would be appreciated that the control operations should be implemented via a monitor while the data operations are implemented via a peer-to-peer connection.

Returning to FIG. 2, at 204, a request is sent to the second application, and the first application and the second application run on the same computing device. Continuing to refer to FIG. 3, after receiving, from the application 311, a request for establishing a socket connection, the monitor 313 executes IP address translation and forwards the socket connection request to the application 312 via the shared memory queue 316. Since the first application and the second application are located on the same computing device (i.e., a single device), embodiments of the present disclosure can achieve the socket connection between different applications (the applications 311 and 312) within the single computing device 310.

At 206, a peer-to-peer socket connection between the first application and the second application is established in the user space of the operating system of the computing device. Continue to refer to FIG. 3, the monitor 313 coordinates establishing, in the user space, peer-to-peer socket connection between the first application 311 and the second application 312, and establishing the peer-to-peer shared memory queue 317. In some embodiments, the monitor 313 may allocate the shared memory to the application 311 and the application 312, and send a key to the shared memory to the application 311 and the application 312, such that the user space peer-to-peer socket connection in the user space may be established between the first application 311 and the second application 312.

Consequently, by establishing the socket connection in the user space of the operating system, embodiments of the present disclosure can achieve a user space socket connection between different applications within a single computing device, thereby improving the performance of the operating system. In addition, since a monitor (or a controller) is used to coordinate inter-application connection establishment and resource allocation, embodiments of the present disclosure can ensure security of the operating system.

Furthermore, in some embodiments of the present disclosure, the monitor is used for coordinating the inter-application control layer operation(s), while the peer-to-peer socket connection is applied to the inter-application data layer operation(s). As such, the monitor is provided only for coordinating inter-application connection establishment and resource allocation, and the peer-to-peer socket connection between applications may be directly applied to data communication (for example, sending, receiving and event polling), without involvement of the monitor. This can ensure security of the operating system, and also improve the performance of the operating system.

Figure 4:
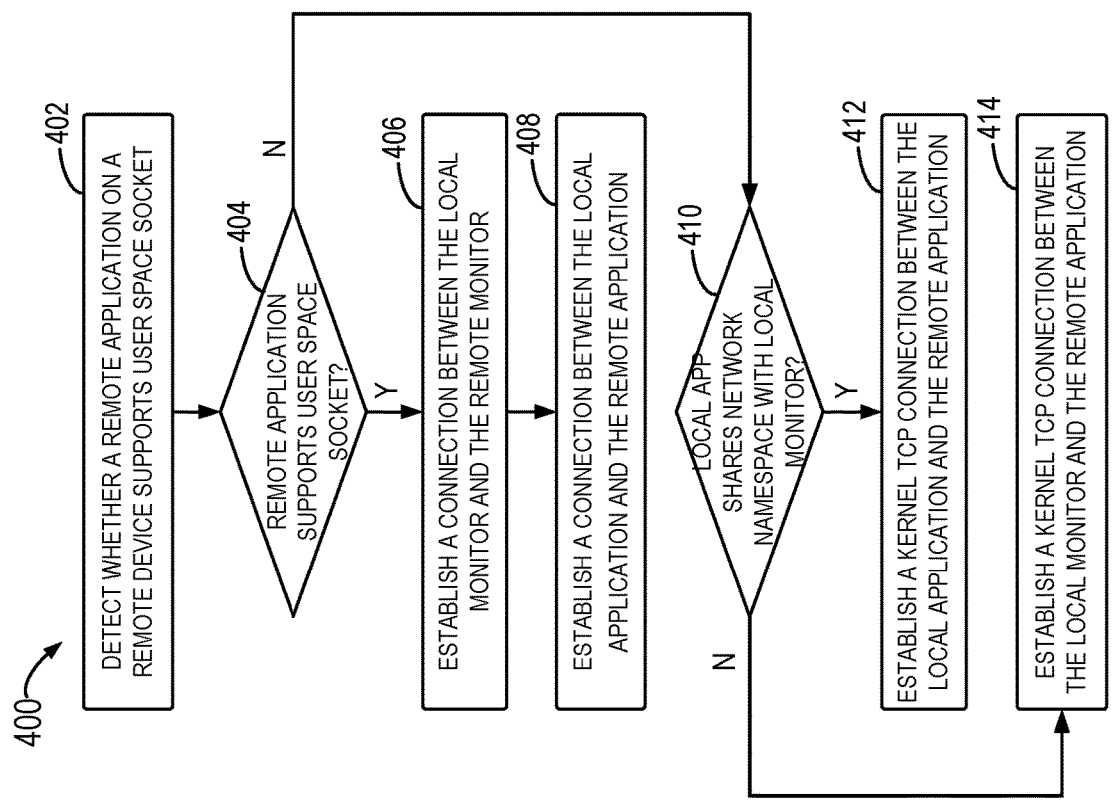
FIG. 4 is a flowchart of a method of implementing a socket connection between different computing devices according to embodiments of the present disclosure.
Figure 5:
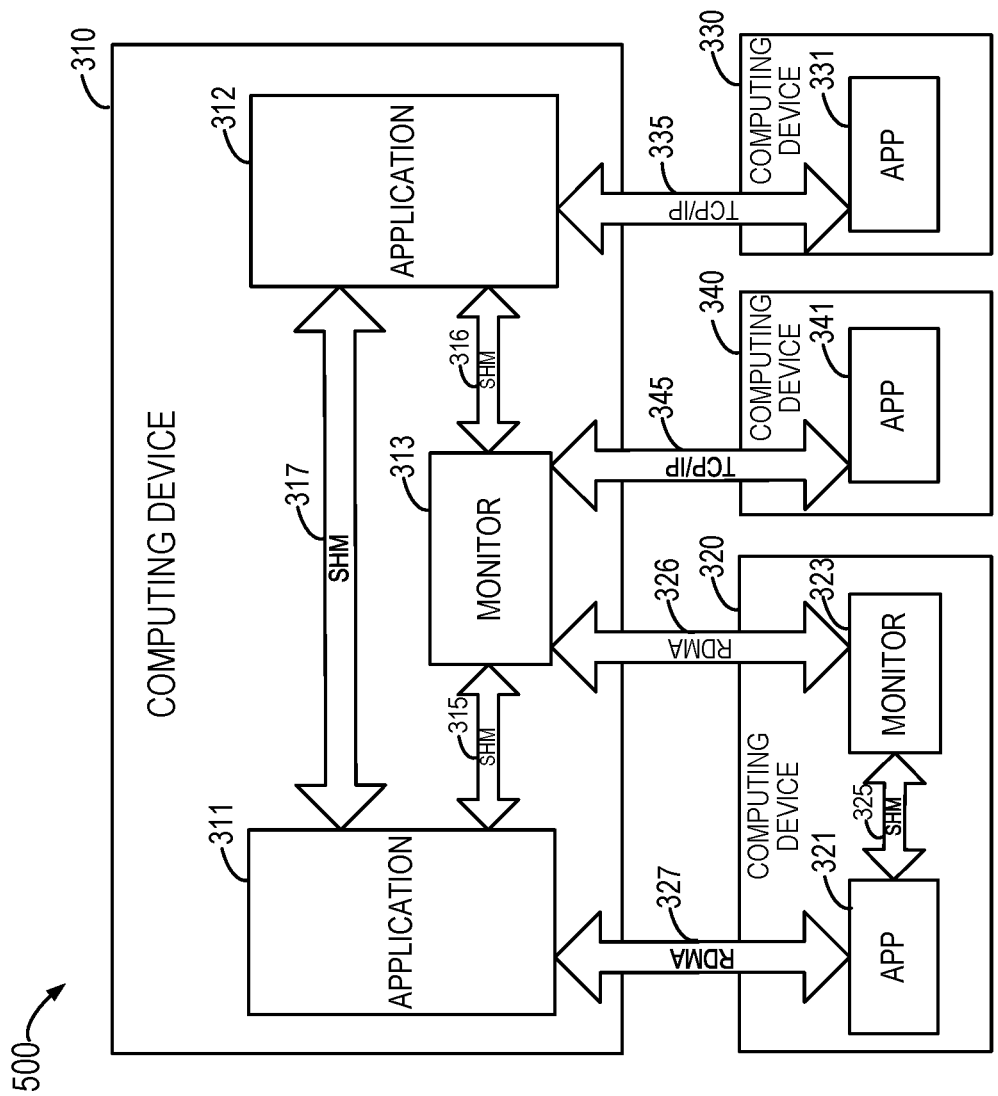
FIG. 5 is a schematic diagram illustrating architecture for implementing a socket connection between different computing devices according to embodiments of the present disclosure.

FIG. 4 is a flowchart illustrating a method 400 of implementing a socket connection between different computing devices according to embodiments of the present disclosure. It would be appreciated that, the method 400 may be executed by the computing device/server 100 as described with reference to FIG. 1. For clarification of the method 400 of FIG. 4, description will be given in combination with an example of architecture 500 as shown in FIG. 5, which is a schematic diagram of the architecture 500 for implementing a socket connection between different computing devices according to embodiments of the present disclosure.

At 402, it is detected whether a remote application on a remote device supports a user space socket (also referred to as "SocketDirect") of the present disclosure. For example, referring to FIG. 5, when the computing device 310 needs to conduct socket communication with remote devices 320, 330 and/or 340, it is required to detect whether the remote devices 320, 330 and/or 340 support the user space socket. As shown in FIG. 5, the remote devices 320, 330 and 340 run thereon respective applications 321, 334 and 341. In addition, the remote device 320 includes a monitor 323, which means that it supports the user space socket, wherein the application 321 has established the shared memory queue 325 with the monitor 323; while the remote devices 330 and 340 include no monitor, indicating that they do not support a user space socket.

In some embodiments, if the local monitor is a client monitor, an original socket may be first initiated, a TCP SYN message with a special option may be sent to a remote device. Then, it is detected whether a TCP SYN+ACK message with the special option is received from the remote device. If the TCP SYN+ACK message with the special option is received from the remote device, it means that the remote device supports the user space socket; and if the TCP SYN+ACK message received from the remote device does not include the special option, it means that the remote device does not support the user space socket.

In some embodiments, if the local monitor is a server monitor, an original socket may be initiated to capture an SYN message at a listening port, and it is detected whether a TCP SYN message with a special option is received from a remote device. If the TCP SYN with the special option is received from the remote device, it indicates that the remote device supports the user space socket; otherwise, it means the remote device does not support the user space socket. In the case that the TCP SYN message with the special option is received from a remote device, the local device may send a TCP SYN+ACK message with the special option to the remote device, and may start the process of establishing a user space socket. In some embodiments, a firewall rule may be installed to manage incoming and outgoing messages.

Returning to FIG. 4, at 404, based on the above detection, it is determined whether a remote application supports a user space socket. For example, the local monitor determines, based on the detection on the remote device, whether the remote application supports a user space socket. If it is determined at 404 that the remote application supports the user space socket, an RDMA connection between the local monitor and the remote monitor is established at 406, and an RDMA connection between the local application and the remote application is established at 408. For example, referring to FIG. 5, the monitor 313 detects that the remote device 320 supports a user space socket, the monitor 313 first establishes an RDMA queue 326 with the monitor 323, and then the monitor 313 and the monitor 323 assist in establishing an RADMA queue 327 between the application 311 and the application 321. After the RDMA queue 327 is established, peer-to-peer remote data transmission may be conducted directly between the application 311 and the application 321. In some embodiments, during establishment of the RDMA queue 327, the monitor 313 and the monitor 323 may proxy data transmission between the application 311 and the application 321. In other words, if no connection is established between a client application and a server application, monitors may be used to help establish a direct connection between the client application and the server application. The server application may send a response including an FD mapping to the client, and thereafter, the server application may immediately start to send data. Correspondingly, after the server application receives the response, the client application can start to send data.

If it is determined at 404 that the remote application does not support the user space socket, the process returns to the kernel socket communication where the monitor creates a kernel TCP connection using a TCP recovery function, and then it is determined at 410 whether the local application can share a network namespace with the local monitor. Embodiments of the present disclosure can provide a method of conducting socket communication with a legacy operating system, thereby ensuring compatibility of network communications.

If it is determined at 410 that the local application can share the network namespace with the local monitor, the recovered TCP connection is sent to the local application, and at 412, the kernel TCP connection is established between the local application the remote application. For example, referring to FIG. 5, if the application 312 can share the network namespace with the monitor 313, a direct TCP/IP queue 335 can be established between the application 312 and the application 331. If it is determined at 410 that the local application cannot share the network namespace with the local monitor, a kernel TCP connection is established between the local monitor and the remote application is established at 414. For example, referring to FIG. 5, the application 311 cannot share the network namespace with the monitor 313, it is required to establish a TCP/IP queue 345 between the monitor 313 and the application 341, and then the monitor 313 proxies the socket communication between the application 311 and the application 341.

Therefore, in the method 400 and the architecture 500 according to embodiments of the present disclosure, if a remote device supports a user space socket, an RDMA connection may be established between the local application and the remote application, thereby speeding up data transmission; and if a remote device does not support a user space socket, embodiments of the present disclosure are compatible with the remote device, thereby ensuring compatibility of network communications. In this way, some embodiments of the present disclosure can support socket communication within a single device, but also achieve inter-device socket communication.

Figure 6A:
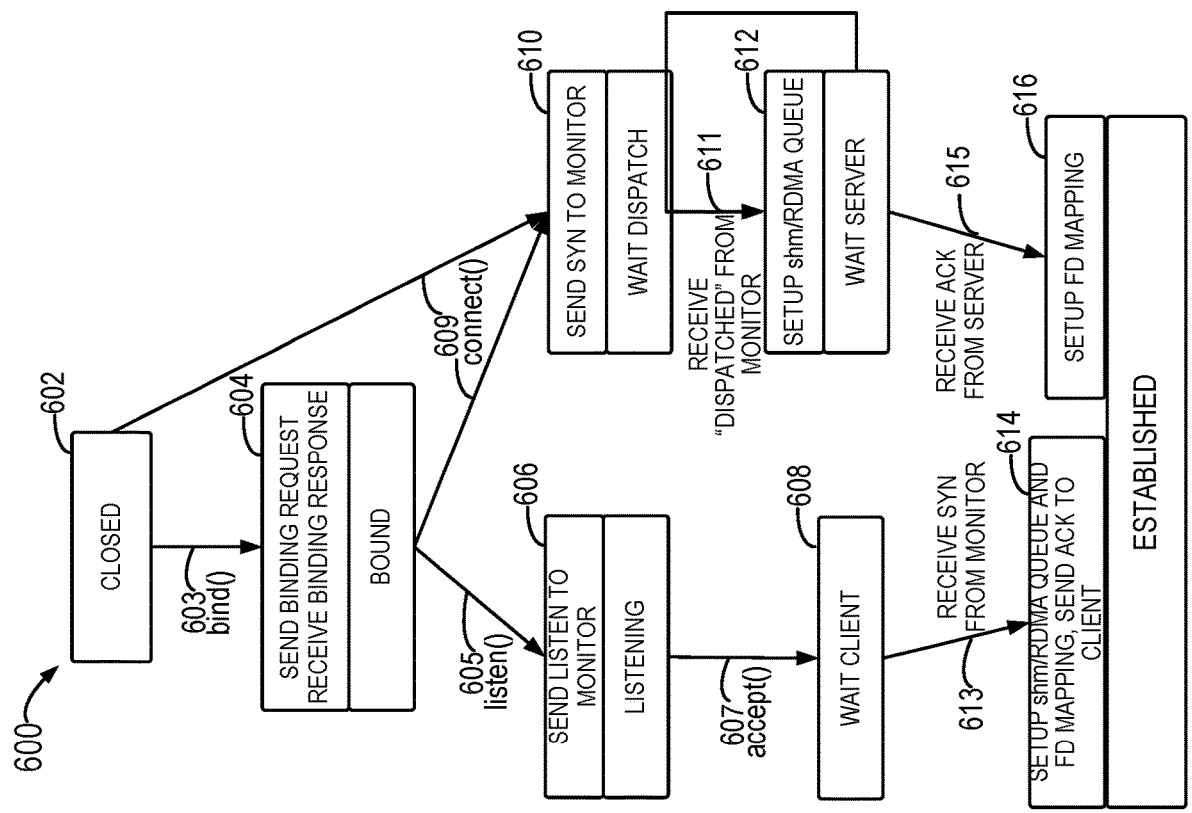
FIG. 6A is a schematic diagram of a state machine for establishing a socket connection according to embodiments of the present disclosure.

FIG. 6A is a schematic diagram 600 illustrating a state machine for establishing a socket connection according to embodiments of the present disclosure, and the state machine of the connection may be maintained locally in each process. It should be appreciated that the monitor as described above may be employed to coordinate establishing a peer-to-peer socket connection between a client application and a server application.

At 602, the client application and the server application are both at a closed state of the connection. During socket establishment, the application may first create a socket identified by an integer FD. The socket FD and other FDs (for example, disk files) share the network namespace, and the operating system typically allocates the minimum available FD. In order not to allocate virtual FDs in the kernel when preserving the semantics, LIBSD intercepts all APIs related to the FD and maintains an FD conversion table to map each application FD to a user space socket FD or kernel FD. When the FD is closed, LIBSD places it into an FD recycle pool. Upon FD allocation, LIBSD first tries to obtain the FD from the recycle pool. If the recycle pool is empty, a new FD is allocated by incrementing an FD assignment counter. The FD recycle pool and the assignment counter may be shared among all threads in the process.

The server application invokes a bind( ) function at 603. Then, at 604, it sends a binding request to the monitor and receives a binding request from the same, the monitor further creates an address translation rule between a physical network and an overlay network, and at this time, the server application is already at a bound state. The binding operation is used for allocating an address and a port, and given that the address and port have global resources for license protection, a monitor may be used to coordinate the allocation. If the binding request does not fail (for example, the port is not bound by other client-side sockets), LISBD may directly return a success.

Next, the server application invokes a listen( ) function at 605 and sends a listen message to the monitor at 606, which is at a listening state at this time. If prepared for accepting a connection from a client, the server application invokes the listen( ) function and notifies the monitor, and the monitor maintains a listened list at each address and port, so as to invoke a new connection. The server application invokes the accept( ) function at 607 and is kept at a waiting state for a client response at 608.

The client application invokes a connect( ) function at 609 and sends an SYN message to the monitor via a shared memory queue at 610, which is in a waiting state for dispatch at this time. After receiving a "dispatched" message from the monitor at 611, the client application establishes a shared memory or RDMA queue at 612, which is in a waiting state for a server response at this time. The monitor converts the IP address and port for use in the overlay network, and then forwards the SYN message to a target application.

At 613, the server application receives, from the monitor, the SYN message from the client application, then establishes a shared memory or RDMA queue as well as an FD mapping, and sends an ACK message to the client application. After receiving the ACK message from the server application at 615, the client application creates the FD mapping at 616. At this time, a connection has been established between the client application and the server application, such that the client application and the server application are in an established state of the connection, respectively, and the client application and the server application can transmit data to each other.

Figure 6B:
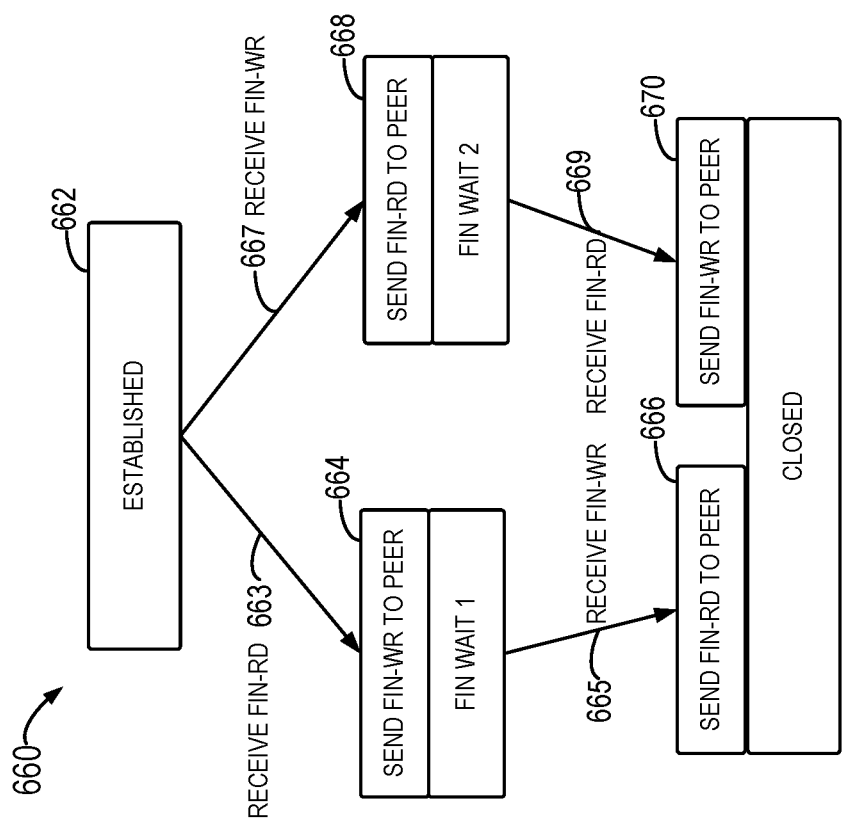
FIG. 6B is a schematic diagram of a state machine for closing a socket connection according to embodiments of the present disclosure.

FIG. 6B is a schematic diagram 660 illustrating a state machine for shutting down a state of the socket connection according to embodiments of the present disclosure. It should be appreciated that the process of closing the socket connection is fully peer to peer, without involvement of a monitor. At 662, the client application and the server application are both at an established state of the connection. If either (which is referred to as first application) of two applications initiates write shutdown (SHUT-WR) or receives a read finish (FIN-RD) message at 663, it sends a write finish (FIN-WR) message to the other application (which is referred to as second application) at 664, and at this time, the first application is at a finish (FIN) waiting state. Thereafter, the first application may initiate a read shutdown (SHUT-RD) message or receive the FIN-WR message at 665, and send the FIN-RD message to the second application at 666. By this time, the two communication directions of the socket communication have been both shut down.

Likewise, if either (which is referred to as first application) of two applications initiates read shutdown (SHUT-RD) or receives a FIN-Rd message at 667, it sends a FIN-RD message to the other application (which is referred to as second application) at 668, and at this time, the first application is at a FIN waiting state. Next, the first application may initiate write shutdown (SHUT-WR) or receive a FIN-RD message at 669, and send a FIN-WR message to the second application at 670. By this time, the two communication directions of the socket communication have been both shut down. Upon receiving shutdown messages from both directions, the process may delete the FD of the connection. According to embodiments of the present disclosure, if the first application shuts down the connection in one direction, it sends a shutdown message to the second application, and the latter may make a response using the shutdown message.

Traditionally, the socket connection is a First-in First-out (FIFO) channel. Since one socket may be shared by a plurality of sending threads and a receiving thread, the traditional technique utilizes a lock for protecting the shared queue, thereby degrading the performance of the operating system significantly.

Figure 7:
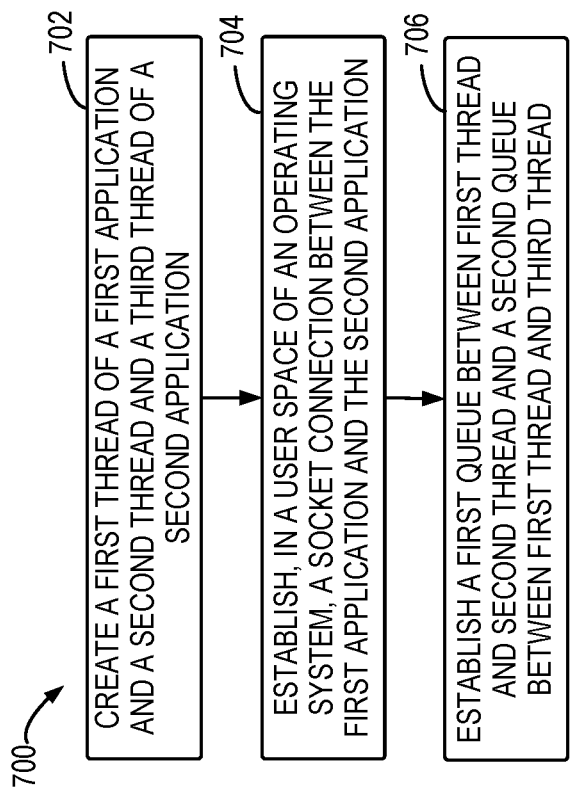
FIG. 7 is a flowchart illustrating a method of establishing queues between multiple threads in a user space according to embodiments of the present disclosure.
Figure 8A:
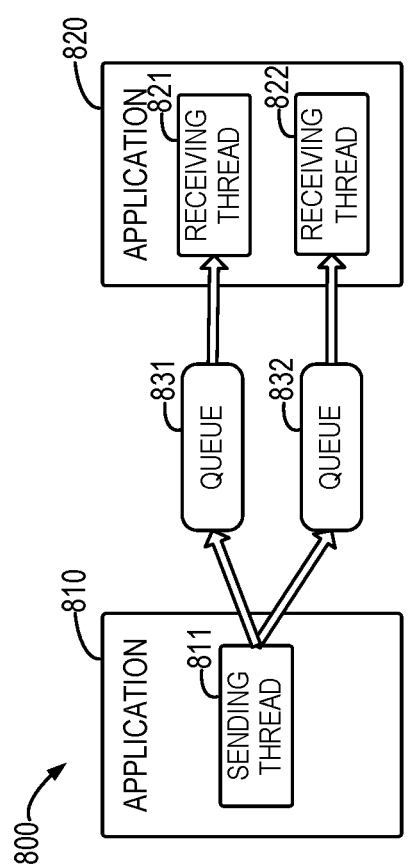
FIG. 8A is a schematic diagram illustrating architecture for establishing queues between a single sending thread and a plurality of receiving threads according to embodiments of the present disclosure.

To this end, embodiments of the present disclosure provide a solution for establishing queues between threads in a user space. FIG. 7 is a flowchart illustrating a method 700 of establishing a separate queue for each pair of client and server threads according to embodiments of the present disclosure. It would be appreciated that the method 700 may be performed by the computing device/server 100 as described with reference to FIG. 1. For clarification of the method 700 of FIG. 7, description will be given below in combination with architecture 800 as shown in FIG. 8A, which is a schematic diagram illustrating the architecture 800 for establishing queues between a single sending thread and a plurality of receiving threads according to embodiments of the present disclosure.

At 702, a first thread of a first application and a second thread and a third thread of a second application are created. For example, referring to FIG. 8A, a sending thread 811 (referred to as "a first thread") is created in an application 810, and a receiving thread 821 (referred to as "a second thread") and a receiving thread 822 (referred as "a third thread") are created in an application 820. It should be appreciated that the application 810 and the application 820 may run in the same computing device, or in a different computing devices.

Returning to FIG. 7, at 704, a socket connection between the first application and the second application is created in the user space of the operating system, where the first thread, the second thread and the third thread share the socket connection. For example, the monitor as described above may be used to coordinate establishing the socket connection between the first application 810 and the second application 820.

At 706, a first queue between the first thread and the second thread and a second queue between the first thread and the third thread are established, and the first queue is different than the second queue. Continuing to refer to FIG. 8A, a queue 831 may be established between the sending thread 811 and the receiving thread 821, and a queue 832 may be established between the sending thread 811 and the receiving thread 822. In other words, a separate queue is established between each sending thread and each receiving thread of the socket connection.

For the same connection, the traditional operating system typically establishes a queue between all sending threads and all receiving threads; however, since one connection may be used simultaneously by a plurality of threads, a lock is required for controlling read and write of different threads. By contrast, embodiments of the present disclosure can avoid the use of a lock by setting a separate queue for each pair of client and server threads, such that the traditional multi-thread synchronization is removed. Consequently, the lockless mechanism according to embodiments of the present disclosure can improve the performance of the operating system significantly.

Figure 8B:
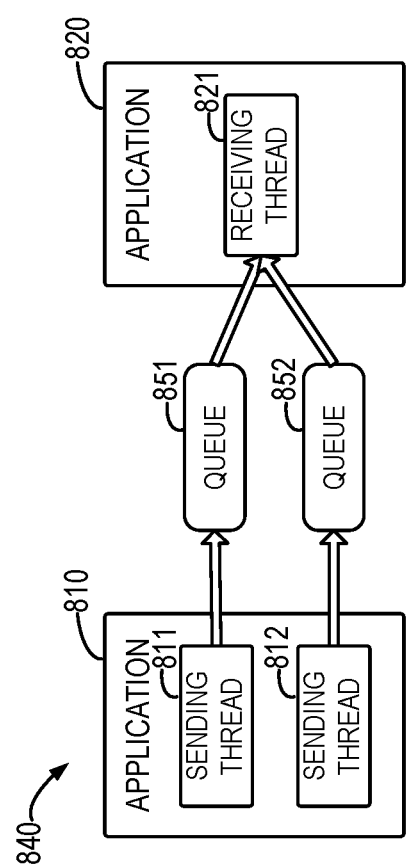
FIG. 8B is a schematic diagram illustrating architecture for establishing queues between a plurality of sending threads and a single receiving thread according to embodiments of the present disclosure.

FIG. 8B is a schematic diagram illustrating architecture 840 for establishing queues between a plurality of sending threads and a single receiving thread. As shown in FIG. 8B, a queue 851 may be established between the sending thread 811 and the receiving thread 821, and a different queue 852 may be established between the sending thread 812 and the receiving thread 821.

Figure 8C:
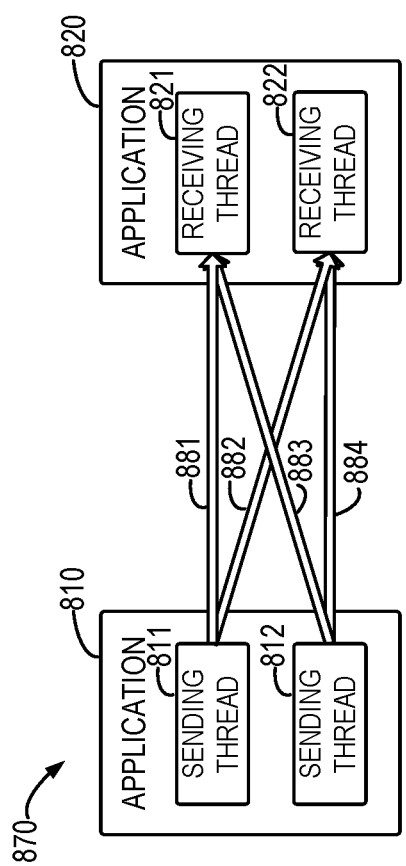
FIG. 8C is a schematic diagram illustrating architecture for establishing queues between a plurality of sending threads and a plurality of receiving threads according to embodiments of the present disclosure.

In addition, when the two applications include a plurality of threads, respectively, a separate queue may be set for each pair of threads. FIG. 8C is a schematic diagram illustrating architecture 870 for establishing queues between multiple sending threads and multiple receiving threads. As shown in FIG. 8C, a queue 881 between the sending thread 811 and the receiving thread 821, a queue 882 between the sending thread 811 and the receiving thread 822, a queue 883 between the sending thread 812 and the receiving thread 822, and a queue 884 between the sending thread 812 and the receiving thread 822. In some embodiments, when the application 810 and the application 820 are located on the same computing device, a shared memory queue may be established between the application 810 and the application 820. Alternatively, when the application 810 and the application 820 are located on different computing devices, an RDMA queue may be established between the application 810 and the application 820.

Figure 9A:
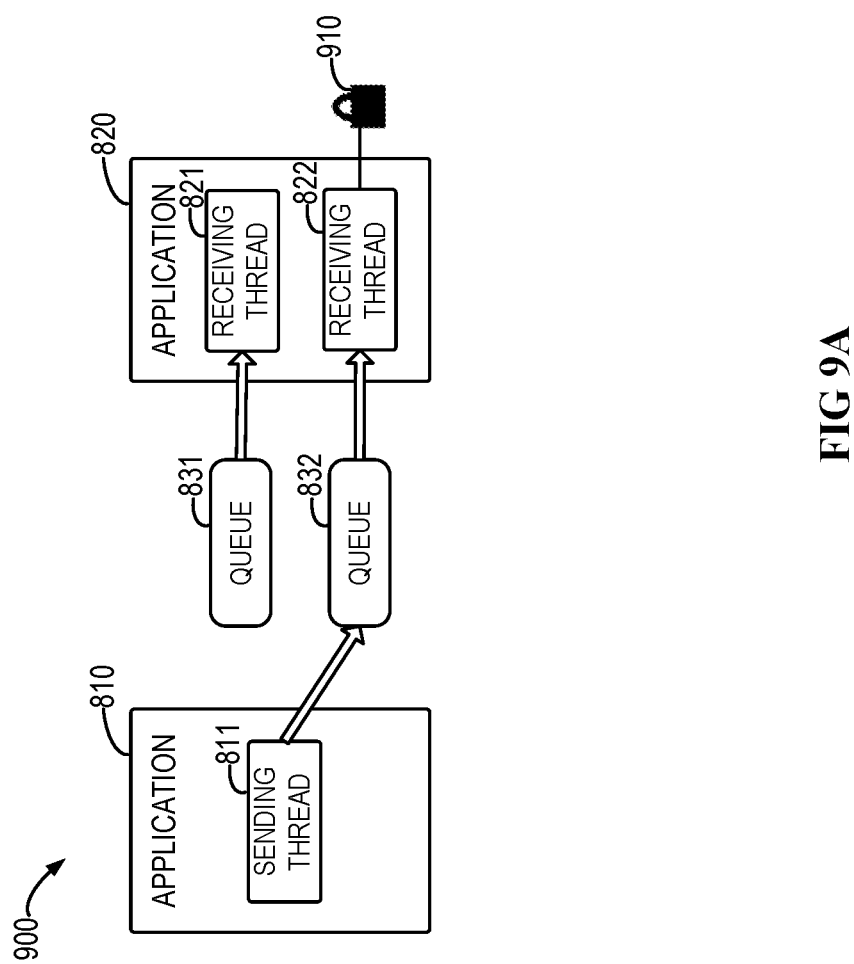
FIGS. 9A-9B are schematic diagrams illustrating architecture for switching a receiving thread for takeover according to embodiments of the present disclosure.
Figure 9B:
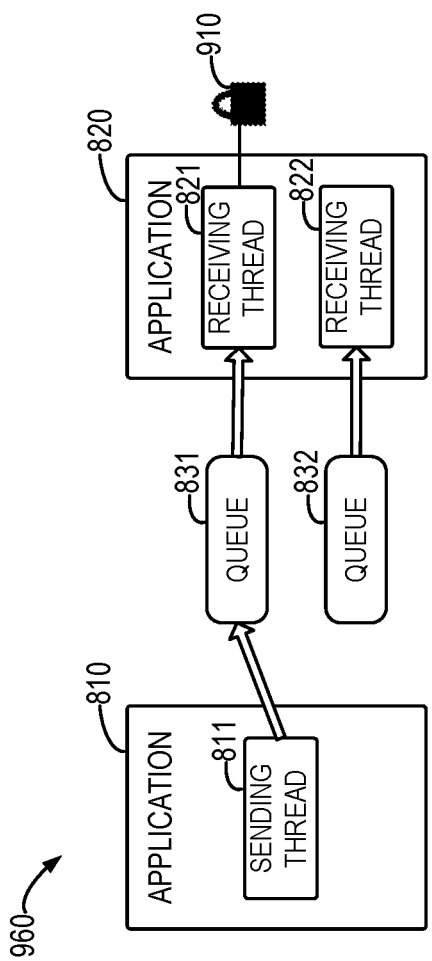

In the case that there are a plurality of receiving threads, to ensure fairness among the receiving threads and guarantee that the receiving sequence of the data is identical to the sending sequence, for a specified socket, there is only one receiving thread that may receive data from the queue at any time. FIGS. 9A-9B are schematic diagrams illustrating architecture of switching a receiving thread for takeover according to embodiments of the present disclosure, wherein FIG. 9A illustrates architecture 900 before the switching, while FIG. 9B illustrates architecture 960 after the switching. As shown in FIG. 9A, the receiving thread 822 is receiving data from the sending thread 811 via the queue 832, and the receiving thread 822 includes a token 910 for receiving data. When the receiving thread 821 attempts to take over the received data from the socket, the receiving thread 821 sends a takeover request to the sending thread 811, and the sending thread 811 then forwards the takeover request to the receiving thread 822 that is receiving data. Next, the receiving thread 822 sends the token 910 to the receiving thread 821 via the sending thread 811. After receiving the token 910, as shown in FIG. 9B, the receiving thread 821 starts to receive data from the sending thread 811 via the queue 831, thereby completing switching of the receiving thread.

In the case that there are remaining data in an old queue when the receiving thread requests for taking over a socket connection, it is required to transfer the remaining data from the old queue (for example, the queue 832) to a new queue (for example, the queue 831). Moreover, when processing the takeover request, the sending thread 811 first forwards it to the current receiving thread 822. Upon receiving the takeover request, the current receiving thread 822 returns, through a takeover completion message, all remaining data to the sending thread 811, and the sending thread 811 forwards remaining data to a new receiving thread 821. During the migration, the sending thread 811 blocks the sending operation and the takeover request to ensure message ranking.

Figure 10:
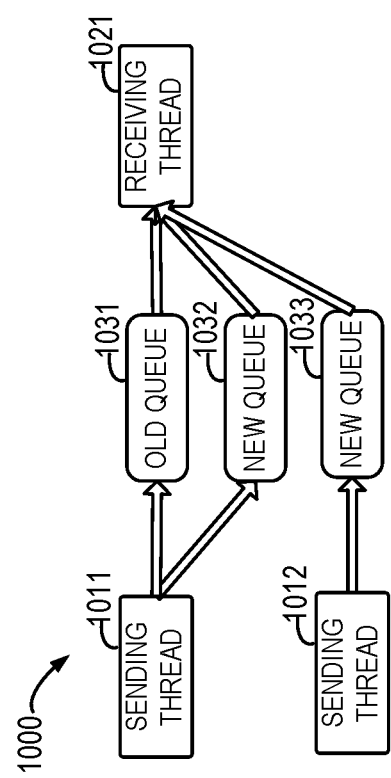
FIG. 10 is a schematic diagram illustrating architecture for a system fork operation according to embodiments of the present disclosure.

FIG. 10 is a schematic diagram illustrating architecture 100 for a fork operation according to embodiments of the present disclosure. The fork operation is a common system fork for creating a new process in an operating system. After calling a fork( ) function, the operating system allocates resources (for example, a space for storing data and code) to a new child process and then copies all data, code and operating system resources of the parent process to the child process, which means that the operating system copies a child process exactly the same as the parent process. In some embodiments, a shared memory queue may be established between the child process and the monitor, and the monitor then synchronizes the information of the child process with the parent process.

As shown in FIG. 10, an old queue 1031 has been established between a sending thread 1011 and a receiving thread 1021. Embodiments of the present disclosure include copying a new sending thread 1012 after performing a fork operation for the sending thread 1011, then establishing a new queue 1032 between the sending thread 1011 and the receiving thread 1021 and establishing a new queue 1033 between the copied sending thread 1012 and the receiving thread 1021, and closing the old queue 1031 after completing data transmission in the old queue 1031. Furthermore, since it is required to preserve the original sending sequence, the new queues 1032 and 1033 may be set as not activated for the time being, and will be activated after the data in the old queue 1031 has been received.

In addition, to be compatible with the existing operating system, it is required to ensure the ranking of messages. For a single receiving thread, the received messages need to be ranked in the same order as the sent messages. For a plurality of receiving threads, the sequences of the sending and receiving operations should be linearized. For example, if a receiving thread $R_1$ receives $D_1$ before a receiving thread $R_2$ invokes a recv( ) function and obtains $D_2$, it is required to ensure that $D_1$ is sent before $D_2$.

By setting a respective queue for each pair of threads, rather than multiplexing an old queue, embodiments of the present disclosure can avoid locked controlling when different threads use the same queue. It is seen that the embodiments of the present disclose is fully compatible with the fork operation of the operating system.

A connection established by a thread is accessible by all threads in the same process. In order to avoid creating a redundant queue and storing a redundant connection state, LIBSD is not eager to share the FD with other threads because most threads in the existing applications do not utilize a connection created by other threads. When a thread indeed needs to access an FD belonging to another thread, LIBSD sends a message to all threads and requests for sharing the FD.

Figure 11:
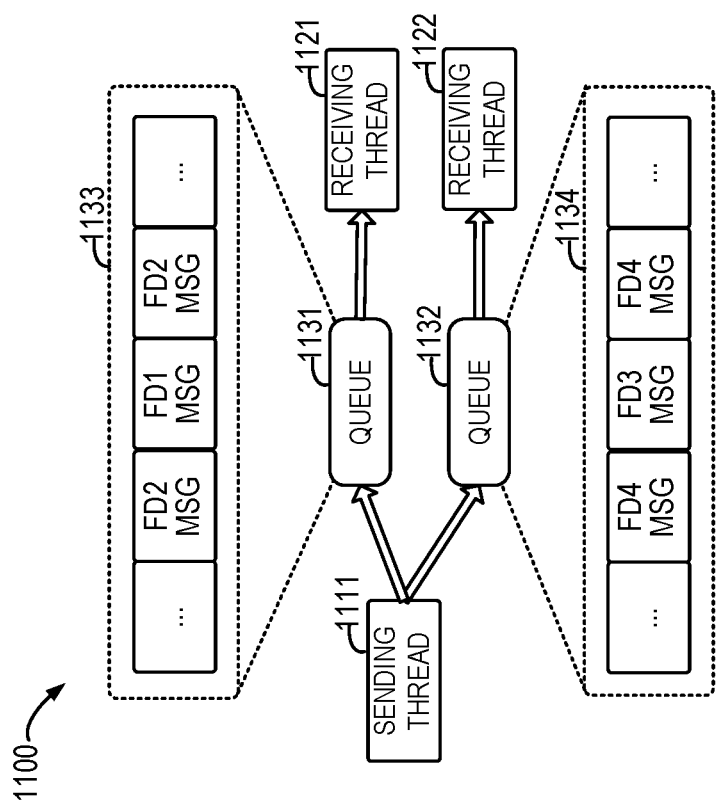
FIG. 11 is a schematic diagram illustrating architecture for multiplexing a plurality of connections using a single queue according to embodiments of the present disclosure.

FIG. 11 is a schematic diagram illustrating architecture 1100 for multiplexing a plurality of connections between a client and server threads, using a single queue, according to embodiments of the present disclosure. As shown in FIG. 11, a queue 1131 has been established between a sending thread 1111 and a receiving thread 1121, and a queue 1132 has been established between the sending thread 1111 and a receiving thread 1122. As shown in FIG. 11, the queue 1131 may be multiplexed such that it can at least include a message for FD1 and a message for FD2, as denoted by 1133. Likewise, the queue 1132 may be multiplexed such that it can at least include a message for FD3 and a message FD4, as denoted by 1134.

In the traditional operating system, a separate queue may be established for each connection (which is identified by an FD). If there is a great number of connections (i.e., high concurrency) which exceeds the buffer space size of the CPU or network card, there will arise the issue of cache lacks, affecting the performance of the operating system. To this end, in some embodiments of the present disclosure, a plurality of connections between each pair of threads may be combined into the same queue, thereby reducing the buffer size occupied by the queue. Therefore, the user space socket architecture according to embodiments of the present disclosure may be extended to a plurality of concurrent connections and a plurality of threads.

In some embodiments, a connection in a plurality of connections containing data to be read may be determined by scanning a separate queue. An epoll( ) function in the operating system is used for polling an incoming data notification from a pre-registered socket FD set. By maintaining a bitmap of the epoll FD set, an FD in each data message may be detected for the bitmap. If the bitmap contains the FD, an event is returned to the application. Since a queue according to embodiments of the present disclosure may include data for a plurality of connections, all connections including data to be read can be determined by scanning only this queue, when executing the epoll( ) function.

In some embodiments, a global cursor may be maintained to restore data queue scanning from the last position in the last scanned queue. Each queue cursor records the last scan position in each queue, to avoid scanning a message twice. Each FD maintains positions of the first and the last scanned (not read) message of the FD. When a new message of the FD is scanned, a pointer in the last message is updated to point to the new message which links the received FD message to a linked list. This is to accelerate the receiving operation. When attempting to receive a plurality of messages from one FD, an application may receive messages along the linked list, without scanning the entire queue.

In some embodiments, to simultaneously poll events from the socket and other FDs (handled by the kernel), LIBSD may create one epoll thread in each process, to wait for all FDs handled by the kernel. When receiving a kernel event, it broadcasts the event to threads of the application via the shared memory queue.

Figure 12:
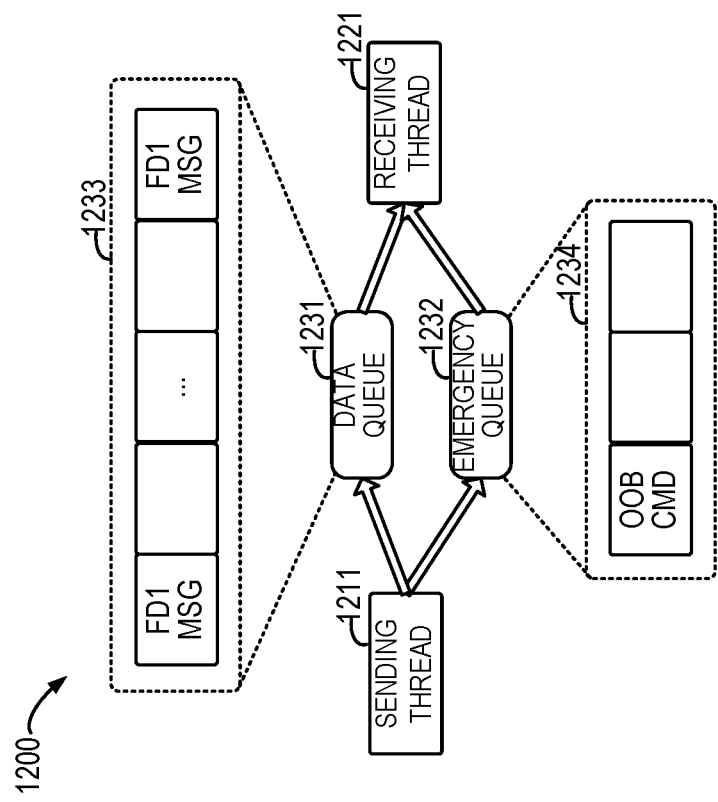
FIG. 12 is a schematic diagram illustrating architecture for establishing an emergency queue between threads according to embodiments of the present disclosure.

FIG. 12 is a schematic diagram illustrating architecture 1200 for establishing an emergency queue between each pair of client and server threads. As shown in FIG. 12, in additional to a data queue 1231 for transmitting data and sequential control commands, an emergency queue 1232 for transmitting out-of-band control commands may be established between a sending thread 1211 and a receiving thread 1221. A set of messages 1233 in the data queue 1231 may be extracted sequentially or from any position when an application invokes the recv( ) function, and if there is a new message in the emergency queue, the receiving thread 1221 immediately retrieves the new message. As shown in FIG. 12, the emergency queue 1232 contains a new message 1234 of an out-of-band control command, the receiving thread 1221 may immediately retrieve the new message 1234. When the data queue 1231 is full, other control messages may be transmitted via the emergency queue 1232. For example, to shut down the receive direction during data transmission, messages should be transmitted via the emergency queue, rather than blocking the shutdown message by the data not read in the data queue.

Embodiments of the present disclosure enable retrieving data in a connection from any position in the data queue, and to pick data in the middle of a data queue, the receiving thread is required to traverse messages in a ring buffer area. During the traversing, the receiving thread iterates messages from a head to an idle space in the ring buffer area which can be determined through a flag. Therefore, when a non-head message is dequeued, the receiver cannot clear the flag. As a result, another flag may be set for each message. When the message is dequeued from the middle, the other flag may be set.

Since the data queue in embodiments of the present disclosure enables retrieving data in a connection from any position, there may be an idle space in the middle, given that messages in the data queue 1231 are blocked by line ends. In this case, embodiments of the present disclosure may send a command for triggering garbage collection via the emergency queue 1232, then scan the idle space in the data queue 1231, and transfer messages to the tail of the data queue 1231, such that the idle space can be collected in the head of the data queue 1231. As such, the sending thread 1211 can continue to send messages to the head of the data queue 1231. It should be appreciated that, since most event-driven applications can retrieve messages sequentially from a data queue, it is unnecessary to execute garbage collection operation in normal cases.

In some embodiments, to extend a socket of a plurality of threads sharing the same CPU core, cooperative multitasking, rather than an event notification mechanism of the operating system, may be employed to efficiently switch a context of a thread on the CPU core. For example, when an application executes blocked socket fork, such as epoll_wait( ) or recv( ), it has already polled all queues once, without receiving a new message. Given that there are a plurality of threads on CPU core, the application may invoke a system fork function sched_yield( ) to switch in context to a next non-blocked thread on the CPU core. As compared with the event notification mechanism of the operating system, the cooperative context switch manner can accelerate the switching speed significantly.

In some embodiments, when an application executes blocked socket fork, for example, epoll_wait( ) or recv( ), and has pooled all queues several times, without receiving a new message, it may send a sleep notification to all peer-to-peer applications via the emergency queue and put itself into sleep. After receiving the sleep notification from the receiving thread, the sending thread may signal the receiving thread to wake up the receiving thread when sending a message to the receiving thread. In this way, the long-time idle threads may be put into sleep, thereby improving execution efficiency of other thread.

Hence, some embodiments of the present disclosure can improve the performance of the operating system when ensuring both security and compatibility of the operating system. As to security, the user space socket according to embodiments of the present disclosure utilizes a monitor to control connection establishment and keep different applications separated, and it can further carry out a firewall rule and an access control policy. As to compatibility, embodiments of the present disclosure can implement intra-device or inter-device socket communication, and return to a TCP connection when a remote device does not support the user space socket function. In addition, some embodiments of the present disclosure can behave correctly with the fork operations and thread establishment. As to performance improvement, embodiments of the present disclosure can achieve high throughput and low latency by setting a separate queue for each pair of threads and/or multiplexing a plurality of connections to the same queue, without degrading the performance obviously when the number of the concurrent connections grows. Moreover, differentiating the control layer operation and the data layer operation is also helpful for improving the performance of the operating system.

The method and functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the present disclosure will be given below.

In one aspect, there is provided a computer-implemented method. The method comprises: receiving, from a first application, a request for establishing a socket connection; sending the request to a second application, wherein the first application and the second application run on the same computing device; and establishing, in a user space of an operating system of the computing device, a peer-to-peer socket connection between the first application and the second application.

In some embodiments, wherein the establishing the peer-to-peer socket connection between the first application and the second application comprises: allocating a shared memory to the first application and the second application; and sending, to the first application and the second application, a key to the shared memory.

In some embodiments, wherein a monitor in the user space is used for coordinating a control layer operation related to the first application and the second application, and the established peer-to-peer socket connection is used for a data layer operation between the first application and the second application.

In some embodiments, wherein the computing device is a first computing device and runs a first monitor for establishing the peer-to-peer socket connection, and the method further comprises: detecting whether a second computing device comprises a second monitor for establishing an inter-application peer-to-peer socket connection; and establishing, based on the detecting, a socket connection between the first application and a third application running on the second computing device.

In some embodiments, wherein the detecting whether a second computing device comprises a second monitor for establishing an inter-application peer-to-peer socket connection comprises at least one of the following: in response to the first monitor acting as a client monitor: sending, to the second computing device, a Transmission Control Protocol (TCP) Synchronize Sequence Number (SYN) message with a special option; and detecting whether receiving, from the second computing device, a TCP SYN+Acknowledgement (ACK) message with the special option; and in response to the first monitor acting as a server monitor: detecting whether receiving, from the second computing device, a TCP SYN message with a special option; and in response to receiving, from the second computing device, the TCP SYN message with the special option, sending a TCP SYN+ACK message with the special option to the second computing device.

In some embodiments, wherein the establishing the socket connection between the first application and the third application running on the second computing device comprises: in response to detecting that the second computing device comprises the second monitor: establishing a Remote Direct Memory Access (RDMA) connection between the first monitor and the second monitor; and establishing a peer-to-peer RDMA connection between the first application and the third application.

In some embodiments, wherein the establishing the peer-to-peer RDMA connection between the first application and the third application comprises: during the establishment of the peer-to-peer RDMA connection, proxying, using the first monitor and the second monitor, data transmission between the first application and the third application.

In some embodiments, wherein the establishing the socket connection between the first application and the third application running on the second computing device comprises: in response to detecting that the second computing device lacks the second monitor: determining whether the first application is able to share a network namespace with the first monitor; in response to determining that the first application is able to share the network namespace with the first monitor, establishing a kernel TCP connection between the first application and the third application; and in response to determining that the first application is not able to share the network namespace with the first monitor, establishing a kernel TCP connection between the first monitor and the third application.

In another aspect, there is provided a computing device. The computing device comprises a processing unit, a network communication unit, and a memory coupled to the processing unit and storing instructions. The instructions comprises a first application, a second application and a monitor in a user space; wherein the monitor, when executed by the processing unit in the user space, performing acts comprising: receiving, from the first application, a request for establishing a socket connection; sending the request to the second application, wherein the first application and the second application run on the computing device; and establishing, in the user space of an operating system of the computing device, a peer-to-peer socket connection between the first application and the second application.

In some embodiments, wherein the establishing the peer-to-peer socket connection between the first application and the second application comprises: allocating a shared memory to the first application and the second application; and sending, to the first application and the second application, a key to the shared memory.

In some embodiments, wherein the monitor in the user space is used for coordinating a control layer operation related to the first application and the second application, and the established peer-to-peer socket connection is used for a data layer operation between the first application and the second application.

In some embodiments, wherein the computing device is a first computing device and the monitor is a first monitor, and the acts further comprise: detecting whether a second computing device comprises a second monitor for establishing an inter-application peer-to-peer socket connection; and establishing, based on the detecting, a socket connection between the first application and a third application running on the second computing device.

In some embodiments, wherein the detecting whether the second computing device comprises the second monitor for establishing the inter-application peer-to-peer socket connection comprises at least one of the following: in response to the first monitor acting as a client monitor: sending, to the second computing device and via the network communication unit, a Transmission Control Protocol (TCP) Synchronize Sequence Number (SYN) message with a special option; and detecting whether receiving, from the second computing device and via the network communication unit, a TCP SYN+Acknowledgement (ACK) message with the special option; and in response to the first monitor acting as a server monitor: detecting whether receiving, from the second computing device and via the network communication unit, a TCP SYN message with a special option; and in response to receiving, from the second computing device and via the communication unit, the TCP SYN message with the special option, sending, to the second computing device, a TCP SYN+ACK message with the special option.

In some embodiments, wherein the establishing the socket connection between the first application and the third application running on the second computing device comprises: in response to detecting that the second computing device comprises the second monitor: establishing, via the network communication unit, a Remote Direct Memory Access (RDMA) connection between the first monitor and the second monitor; and establishing, via the network communication unit, a peer-to-peer RDMA connection between the first application and the third application.

In some embodiments, wherein the establishing the peer-to-peer RDMA connection between the first application and the third application comprises: during the establishment of the peer-to-peer RDMA connection, proxying, using the first monitor and the second monitor, data transmission between the first application and the third application.

In some embodiments, wherein the establishing the socket connection between the first application and the third application running on the second computing device comprises: in response to detecting that the second computing device lacks the second monitor: determining whether the first application is able to share a network namespace with the first monitor; in response to determining that the first application is able to share the network namespace with the first monitor, establishing a kernel TCP connection between the first application and the third application; and in response to determining that the first application is not able to share the network namespace with the first monitor, establishing a kernel TCP connection between the first monitor and the third application.

In a further aspect, there is provided a computer program product. The computer program product is stored in a non-transient computer readable medium and comprises machine-executable instructions, The machine-executable instructions, when running in a computing device, cause the computing device to perform: receiving, from a first application, a request for establishing a socket connection; sending the request to a second application, wherein the first application and the second application run on the computing device; and establishing, in a user space of an operating system of the computing device, a peer-to-peer socket connection between the first application and the second application.

In some embodiments, wherein the establishing the peer-to-peer socket connection between the first application and the second application comprises: allocating a shared memory to the first application and the second application; and sending, to the first application and the second application, a key to the shared memory.

In some embodiments, wherein a monitor in the user space is used for coordinating a control layer operation related to the first application and the second application, and the established peer-to-peer socket connection is used for a data layer operation between the first application and the second application.

In some embodiments, wherein the computing device is a first computing device and runs a first monitor for establishing the peer-to-peer socket connection, and the machine-executable instructions, when running in the computing device, cause the computing device to perform: detecting whether a second computing device comprises a second monitor for establishing an inter-application peer-to-peer socket connection; and establishing, based on the detecting, a socket connection between the first application and a third application running on the second computing device.

In some embodiments, wherein the detecting whether the second computing device comprises the second monitor for establishing the inter-application peer-to-peer socket connection comprises at least one of the following: in response to the first monitor acting as a client monitor: sending, to the second computing device and via the network communication unit, a Transmission Control Protocol (TCP) Synchronize Sequence Number (SYN) message with a special option; and detecting whether receiving, from the second computing device and via the network communication unit, a TCP SYN+Acknowledgement (ACK) message with the special option; and in response to the first monitor acting as a server monitor: detecting whether receiving, from the second computing device and via the network communication unit, a TCP SYN message with a special option; and in response to receiving, from the second computing device and via the communication unit, the TCP SYN message with the special option, sending, to the second computing device, a TCP SYN+ACK message with the special option.

In some embodiments, wherein the establishing the socket connection between the first application and the third application running on the second computing device comprises: in response to detecting that the second computing device comprises the second monitor: establishing, via the network communication unit, a Remote Direct Memory Access (RDMA) connection between the first monitor and the second monitor; and establishing, via the network communication unit, a peer-to-peer RDMA connection between the first application and the third application.

In some embodiments, wherein the establishing the peer-to-peer RDMA connection between the first application and the third application comprises: during the establishment of the peer-to-peer RDMA connection, proxying, using the first monitor and the second monitor, data transmission between the first application and the third application.

In some embodiments, wherein the establishing the socket connection between the first application and the third application running on the second computing device comprises: in response to detecting that the second computing device lacks the second monitor: determining whether the first application is able to share a network namespace with the first monitor; in response to determining that the first application is able to share the network namespace with the first monitor, establishing a kernel TCP connection between the first application and the third application; and in response to determining that the first application is not able to share the network namespace with the first monitor, establishing a kernel TCP connection between the first monitor and the third application.

Although the present disclosure has been described in language specific to structural features and/or methodological acts, it should be understood that the subject matters specified in the appended claims are not necessarily limited to the specific features or acts described above. Rather, the specific features and acts described above are disclosed as example forms of implementing the claims.

The invention claimed is:

1. A computer-implemented method, comprising:
establishing, by a first monitor and in a user space of an operating system of a first computing device, a user space peer-to-peer socket connection for a first application;
detecting whether a second computing device comprises a second monitor for establishing an inter-application peer-to-peer socket connection comprising at least one of:
in response to the first monitor acting as a client monitor: sending, to the second computing device, a Transmission Control Protocol (TCP) Synchronize Sequence Number (SYN) message with a special option; and
detecting whether receiving, from the second computing device, a TCP SYN+Acknowledgement (ACK) message with the special option; and
in response to the first monitor acting as a server monitor: detecting whether receiving, from the second computing device, a TCP SYN message with a special option; or
in response to receiving, from the second computing device, the TCP SYN message with the special option, sending a TCP SYN+ACK message with the special option to the second computing device; and
establishing, based on the detecting, a socket connection between the first application and a second application running on the second computing device.

2. The method of claim 1, wherein the establishing the user space peer-to-peer socket connection between the first application and the second application comprises:
allocating a shared memory to the first application and the second application; and
sending, to the first application and the second application, a key to the shared memory.

3. The method of claim 1, further comprising:
coordinating, by the first monitor, a control layer operation related to the first application and the second application; and
using the established user space peer-to-peer socket connection for a data layer operation between the first application and the second application.

4. The method of claim 1, wherein the method further comprises:
establishing, based on the detecting, a socket connection between the first application and a third application running on the second computing device.

5. The method of claim 4, wherein the establishing the socket connection between the first application and the third application running on the second computing device comprises:
in response to detecting that the second computing device comprises the second monitor:
establishing a Remote Direct Memory Access (RDMA) connection between the first monitor and the second monitor; and
establishing a peer-to-peer RDMA connection between the first application and the third application.

6. The method of claim 5, wherein the establishing the peer-to-peer RDMA connection between the first application and the third application comprises:
during the establishment of the peer-to-peer RDMA connection, proxying, using the first monitor and the second monitor, data transmission between the first application and the third application.

7. The method of claim 4, wherein the establishing the socket connection between the first application and the third application running on the second computing device comprises:
in response to detecting that the second computing device lacks the second monitor:
determining whether the first application is able to share a network namespace with the first monitor,
in response to determining that the first application is able to share the network namespace with the first monitor, establishing a kernel TCP connection between the first application and the third application; and
in response to determining that the first application is not able to share the network namespace with the first monitor, establishing a kernel TCP connection between the first monitor and the third application.

8. A computer device, comprising:
a processing unit;
a network communication unit; and
a memory coupled to the processing unit and storing instructions, the instructions comprising a first application, a second application and a monitor in a user space; wherein the monitor, when executed by the processing unit in the user space, performing acts comprising:

establishing, by a first monitor and in the user space of an operating system of a first computing device, a user space peer-to-peer socket connection for the first application;

detecting whether a second computing device comprises a second monitor for establishing an inter-application peer-to-peer socket connection comprising at least one of:

in response to the first monitor acting as a client monitor:
sending, to the second computing device, a Transmission Control Protocol (TCP) Synchronize Sequence Number (SYN) message with a special option; and
detecting whether receiving, from the second computing device, a TCP SYN+Acknowledgement (ACK) message with the special option; and in response to the first monitor acting as a server monitor:
detecting whether receiving, from the second computing device, a TCP SYN message with a special option; or
in response to receiving, from the second computing device, the TCP SYN message with the special option, sending a TCP SYN+ACK message with the special option to the second computing device; and establishing, based on the detecting, a socket connection between the first application and the second application running on the second computing device.

9. The device of claim 8, wherein the establishing the user space peer-to-peer socket connection between the first application and the second application comprises:

allocating a shared memory to the first application and the second application; and sending, to the first application and the second application, a key to the shared memory.

10. The device of claim 8, wherein the monitor in the user space is used for coordinating a control layer operation related to the first application and the second application, and the established user space peer-to-peer socket connection is used for a data layer operation between the first application and the second application.

11. The device of claim 8, wherein the acts further comprise:

establishing, based on the detecting, a socket connection between the first application and a third application running on the second computing device.

12. The device of claim 11, wherein the establishing the socket connection between the first application and the third application running on the second computing device comprises:

in response to detecting that the second computing device comprises the second monitor:
establishing, via the network communication unit, a Remote Direct Memory Access (RDMA) connection between the first monitor and the second monitor; and
establishing, via the network communication unit, a peer-to-peer RDMA connection between the first application and the third application.

13. A non-transitory computer program product stored in a computer readable medium and comprising machine-executable instructions, the machine-executable instructions, when running in a computing device, causing the computing device to implement a monitor that performs operations comprising:

establishing, by a first monitor and in a user space of an operating system of a first computing device, a user space peer-to-peer socket connection for a first application;

detecting whether a second computing device comprises a second monitor for establishing an inter-application peer-to-peer socket connection comprising at least one of:

in response to the first monitor acting as a client monitor:
sending, to the second computing device, a Transmission Control Protocol (TCP) Synchronize Sequence Number (SYN) message with a special option; and
detecting whether receiving, from the second computing device, a TCP SYN+Acknowledgement (ACK) message with the special option; and in response to the first monitor acting as a server monitor:
detecting whether receiving, from the second computing device, a TCP SYN message with a special option; or
in response to receiving, from the second computing device, the TCP SYN message with the special option, sending a TCP SYN+ACK message with the special option to the second computing device, and establishing, based on the detecting, a socket connection between the first application and a second application running on the second computing device.

* * * * *